Oct. 18, 1966 J. R. COTTER 3,280,259

TELEPHONE REPEATER AND PORTABLE TELEPHONE COMMUNICATION SYSTEMS UTILIZING POWER LINE CARRIER CURRENTS

Filed Sept. 27, 1962 3 Sheets-Sheet 1

INVENTOR.
JOHN R. COTTER
BY
Le Roy J. Leishman
AGENT

Oct. 18, 1966 J. R. COTTER 3,280,259

TELEPHONE REPEATER AND PORTABLE TELEPHONE COMMUNICATION SYSTEMS UTILIZING POWER LINE CARRIER CURRENTS

Filed Sept. 27, 1962 3 Sheets-Sheet 2

INVENTOR.
JOHN R. COTTER
BY Le Roy J. Leishman
AGENT

INVENTOR.
JOHN R. COTTER
BY
Le Roy J. Leishman
AGENT

United States Patent Office 3,280,259
Patented Oct. 18, 1966

3,280,259

TELEPHONE REPEATER AND PORTABLE TELEPHONE COMMUNICATION SYSTEMS UTILIZING POWER LINE CARRIER CURRENTS

John R. Cotter, 17421 Sherman Way, Van Nuys, Calif.

Filed Sept. 27, 1962, Ser. No. 226,548
9 Claims. (Cl. 179—2.5)

The invention herein described pertains to a telephone extension system comprising a portable or mobile carrier telephone transmitter and receiver operating in conjunction with a repeater transmitter and receiver cooperating with a regular telephone, and it more particularly pertains to apparatus of this type in which the power for the complete apparatus is obtained, and the transmission and reception effected, by means of the same commercial power network.

Various "wired-wireless" telephone systems have been suggested and used in the past, but they have required special connections both to the telephone whose use is extended by the system and to the power lines over which the carrier currents are transmitted. One object of the present invention is to provide an extension system having none of these disadvantages.

Another object is to provide carrier system apparatus for direct association with a standard telephone that will pick up the modulations coming into the receiver in the regular telephone handset and transmit them to a remote mobile telephone and that will reproduce sounds initially picked up by such remote telephone and repeat them into the microphone or mouthpiece of the regular telephone.

An additional object of the invention is to effect this two-way cooperation between the standard telephone and the electronic apparatus to be used therewith without requiring any mechanical or wired connections between them.

A further object of my invention is to provide portable or mobile apparatus incorporating a radio-type carrier current transmitter and receiver embodying a microphone and speaker that will communicate by way of carrier currents with the apparatus being used with the regular telephone.

Another object is to provide equipment of the type described that will operate by way of carrier currents without requiring any connection with the power lines over which the carrier currents are transmitted other than to plug the apparatus into standard outlets that are connected to commercial power lines for sundry other purposes.

An additional object is to provide portable equipment of the type described that will be compact and operable anywhere within the territory where the power lines are so interconnected with those supplying the stationary equipment that the transmission of the carrier currents will not be interrupted.

Still another object of my invention is to provide means in connection with the aforementioned apparatus that will cause a bell forming a part of the mobile telephone equipment to ring whenever the bell rings in the distant stationary telephone with which my extension system is being used.

A further object of my invention is to provide apparatus for use with the associated telephone that will include a rest, cradle or support for the regular telephone handset and that will substitute a mechanical device for actuating the switch normally operated by removing the said handset from its cradle or by placing it back thereon.

Another object of my invention is to provide apparatus that will cause the aforementioned mechanical device to actuate the said telephone switch whenever the handset of the remote unit is lifted from its cradle.

Yet another object is to provide apparatus operable in conjunction with said mechanical device for turning on the transmitter of the apparatus used in connection with the standard telephone.

Still other objects will appear as the specification proceeds.

My invention may utilize any type of equipment for generating the required carrier currents and for modulating, demodulating and amplifying them, such as vacuum tubes, transistors or such other equivalent equipment as may become available; but for purposes of illustration, I have chosen an embodiment of my invention in which these functions are performed by transistors, although the block diagrams indicate merely the general components required.

Figures 1, 1A, 1B:
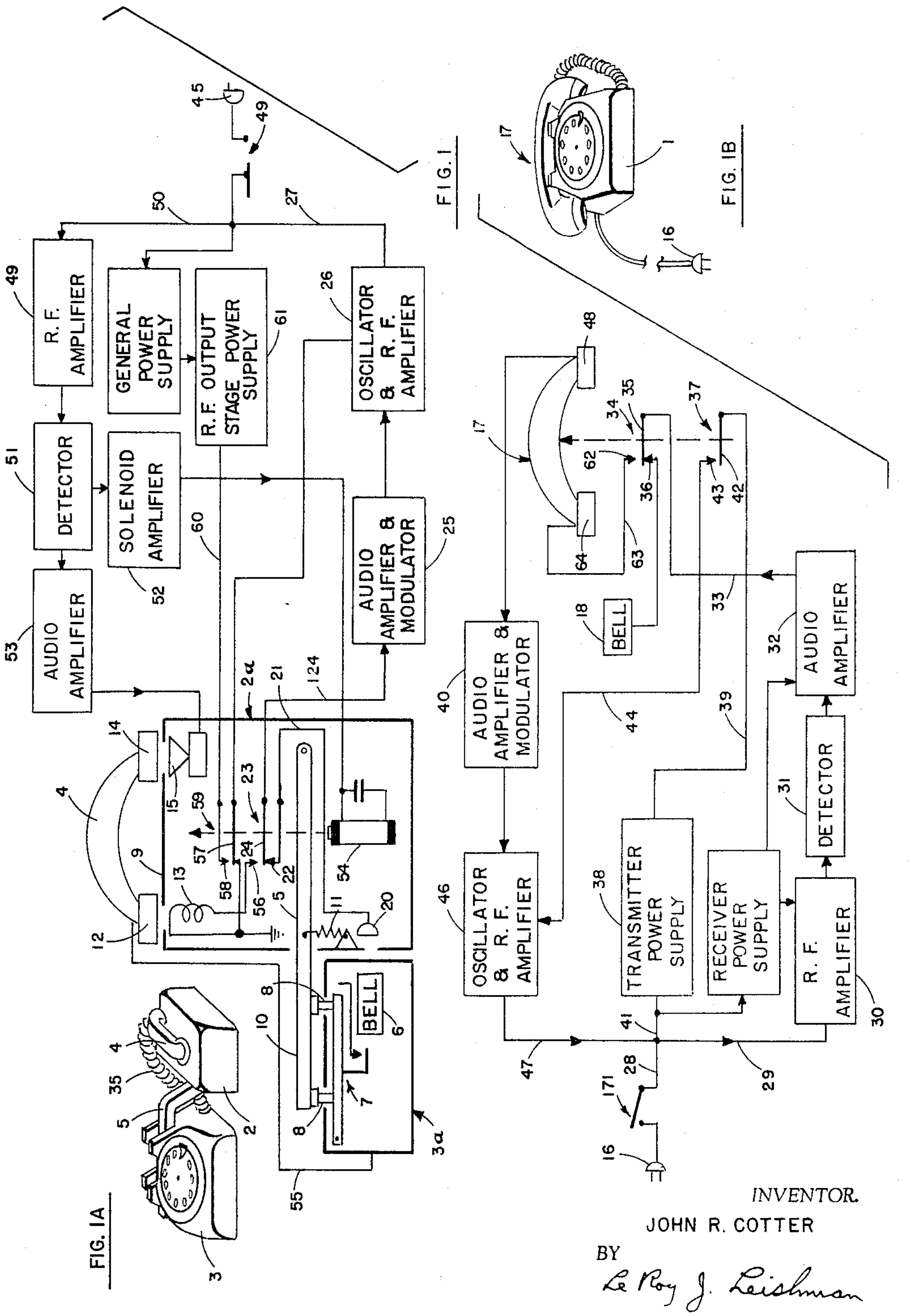
FIG. 1 is a block diagram of the apparatus to be used in local association with the telephone whose service is to be extended and of my mobile unit or apparatus, the upper portion of the block diagram showing the local installation, and the lower part representing the portable equipment.
FIG. 1A is a perspective view of my apparatus in local association with a standard telephone.
FIG. 1B is a perspective view of my portable equipment whose handset and handset-operated switches are shown diagrammatically in the adjacent portions of FIG. 1.

The mobile unit required for my system may resemble a standard telephone desk set such as is shown in FIG. 1B with a chord and plug for plugging it into a standard power outlet. All of the electrical and mechanical components may be embodied in the case 1.

As shown in FIG. 1A, a small unit 2 is used in conjunction with the base portion 3 of the standard telephone. The handset 4 of this telephone has been removed from the cradle in which it normally rests and has been placed instead on my unit 2 which comprises all of the components required for use in conjunction with the regular telephone with the exception of the lever 5 that protrudes from the unit and rests in the position on the standard telephone normally occupied by the handset 4.

Referring to the block diagram of FIG. 1, the base of the standard telephone is indicated at 3*a*. This symbolic unit shows the particular components normally within the base 3 of the standard telephone that cooperate with my apparatus, these components being the bell 6, the switching device 7 and the operating buttons 8.

The lower block diagram portion of FIG. 1 corresponds in general to the unit 2 shown in FIGURE 1A, but for purposes of clarity and explanation, most of the electronic components that are normally provided in my unit 2 have been shown outside of the lower block diagram, thus isolating the special switches and other components of my apparatus within the lower block diagram for easier explanation. Units 2*a* and 3*a* are also shown in connection with the schematic diagram of the circuits in FIG. 2.

Any embodiment of my invention should include a suitable support 9 for the handset 4 of the regular telephone. This of course may be provided in any of a variety of forms. The local unit of my extension telephone system comprises a lever or other device 5 that may protrude from one side of the housing 2 in which the various components are encased, this device 5 in the embodiment shown taking the form of a lever whose outward extension 10, FIG. 1, must be so disposed that it rests on the operating buttons 8 that are normally positioned within the confines of the cradle of the standard telephone unit 3 where the handset usually rests. The extension 10 of the lever 5, by pressure upon the buttons 8, holds the regular telephone switch 7 in its open or out-of-use position. A spring 11 in the unit *2a* holds the lever 5 in this out-of-use position, assuring proper pressure upon the telephone switch buttons 8.

The sound produced in the receiver or speaker unit 12 of the headset 4 may of course be picked up acoustically by a microphone, or the current variations which actuate the diaphragm of the reeciver 12 by means of the customary magnetic coil, may be picked up inductively. Accordingly, it is immaterial to the practice of my invention whether or not such pickup is effected inductively or acoustically, and therefore the pickup unit 13 which must be disposed in close proximity to the receiver 12 may be either a microphone or a suitable magnetic pickup coil. The assembly *2a* must include a reproducer or speaker disposed in close proximity to the transmitter or mouthpiece 14 of the headset 4.

As will hereinafter be explained, the speaker 15 reproduces the sound from the remote telephone unit that is a part of my equipment, and the sound reproduced by this speaker is picked up by the standard telephone microphone 14.

Figure 2:
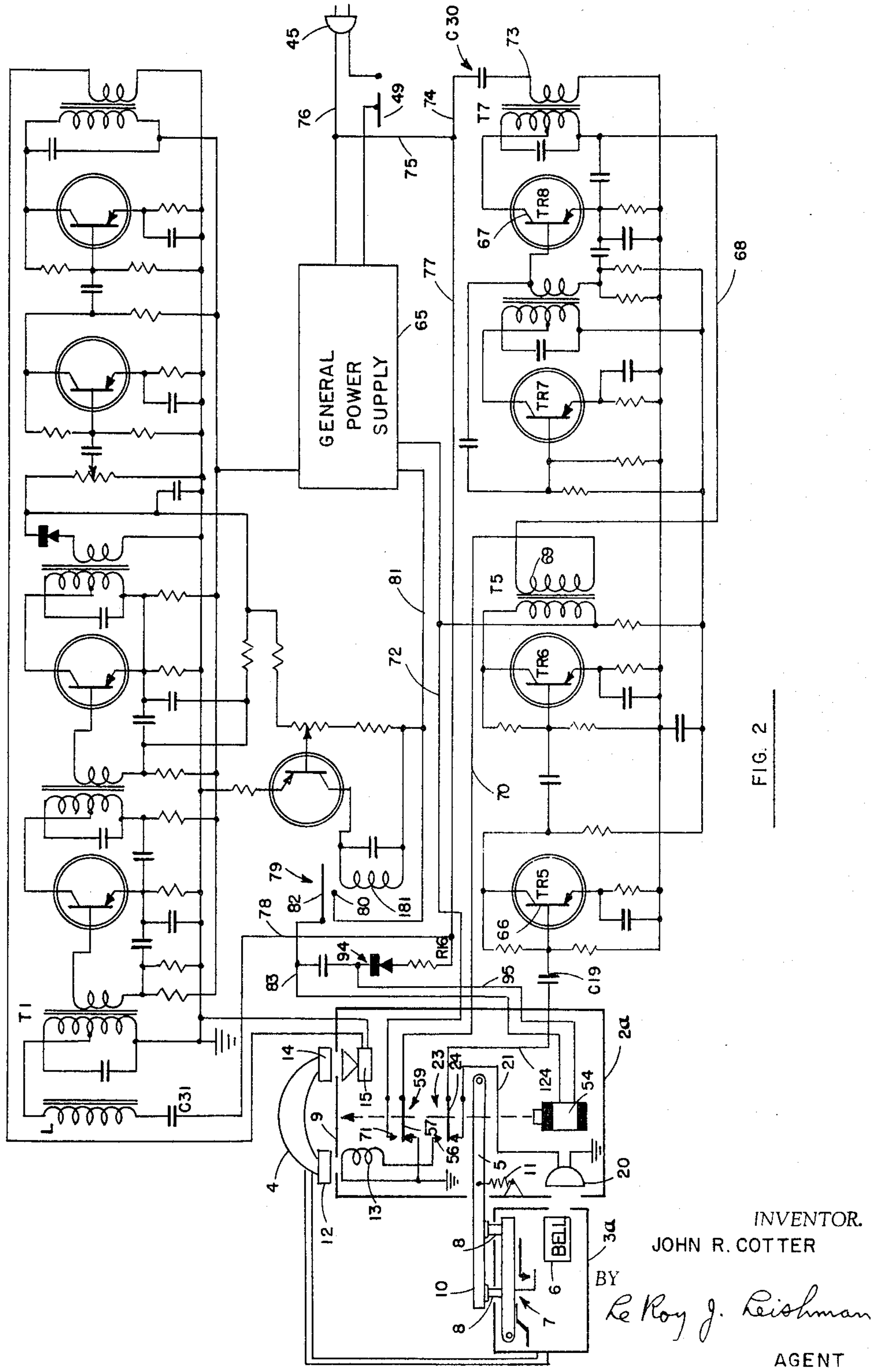
FIG. 2 is a schematic diagram of the apparatus used locally in conjunction with the standard telephone, showing the essential components of this apparatus as required in one embodiment of my invention.
Figure 3:
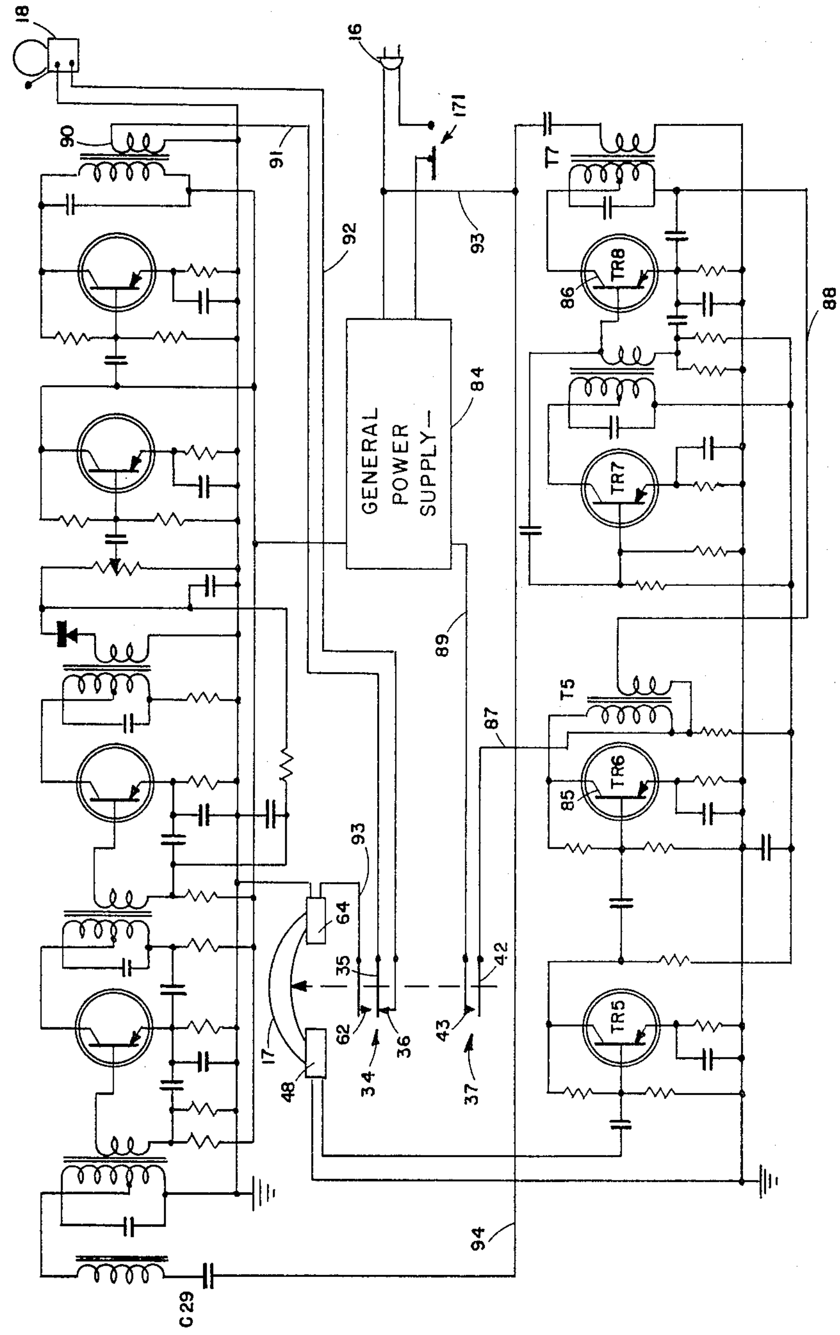
FIG. 3 is a schematic diagram of one embodiment of my portable or mobile unit or assembly which may be plugged into any outlet that is a part of the same power network supplying the location where the regular telephone is located.

The portable or mobile unit or assembly shown in FIGS. 1B and 3 must be ready for use in advance of any anticipated calls that may be relayed from the local or stationary unit shown in FIGS. 1A and 2. The plug 16 is accordingly plugged into an appropriate power supply outlet receiving its current from the same network that supplies the local or stationary apparatus, and the mobile unit is made ready for use by moving the switch 171, FIGS. 1 and 3, to the on or operative position.

The various components and circuits of my mobile and stationary units are so arranged that the bell 18 of the mobile unit rings in response to the ringing of the bell 6 of the telephone whose services are to be extended to remote points by my apparatus. In order to bring this about, I provide a microphone 20 in my stationary or local assembly so disposed therein that it may be brought close to the regular telephone bell 6 of the standard or regular telephone with which my equipment is to operate. This bell 6 is sometimes mounted in the base unit 3, or it may be found in a box mounted on a wall or in some other location close to the telephone whose circuits incorporate the said bell. For purposes of illustration, however, I have shown the bell 6 within the base *3a* of the standard telephone whose services are to be extended by my equipment. The microphone 20 that is a part of my stationary or local assembly should preferably be positioned close to the bell 6 so that it will be especially responsive to sounds therefrom rather than to sounds from other sources. This microphone is shown in such a position both in the block diagram of FIG. 1 and in the schematic diagram of FIG. 2.

Referring now to FIG. 1, the said microphone 20 is connected by an appropriate conductor 21 to the stationary contact 22 of a doublethrow switch 23. The armature or pole 24 of this switch is connected by conductor 124 to the audio amplifier and modulator 25 which in turn is coupled to the radio frequency oscillator and amplifier 26. The output of the radio frequency amplifier is supplied to the power lines by means of an appropriate connection 27, as indicated in FIG. 1. The modulated carrier thus transmitted may be picked up by means of the receiving equipment connected to the power network by the aforementioned plug 16 of the portable unit.

This carrier current passes through the switch 171 and the cords 28 and 29, shown in the lower portion of FIG. 1, to the radio frequency amplifier 30. This amplifier is appropriately connected to the detector 31 and the audio amplifier 32 where the demodulated signal is conducted through cord 33 to the pole 35 of the single-pole, double-throw switch 34. The movable arm 35 normally rests on the contact 36 connected to the bell 18.

When the user of the portable or mobile equipment hears the bell 18, he answers in the usual manner by lifting the handset 17 from its cradle, not shown. As indicated in FIG. 1, the lifting of the handset 17 actuates the double-throw switch 34 as well as the switch 37, which serves the purpose, once the handset 17 has been raised, of connecting the transmitter power supply 38 to the oscillator and radio frequency amplifier 46. The transmitter power supply unit is of course energized from the power lines through the plug 16 and the cords or cables 28 and 41. This power supply unit is connected to the switch 37 by means of the cord or cable 39; and when the switch 37 is in its on position, its movable arm 42 engages contact 43 connected by conductor 44 to the oscillator and radio frequency amplifier 46. The audio amplifier and modulator 40, as indicated in the block diagram of FIG. 1, are connected to the oscillator and radio frequency amplifier 46 whose carrier is fed to the power network through the conductor 47. Inasmuch as the microphone 48 is connected to the audio amplifier and modulator 40, the latter modulates the outgoing carrier in accordance with the audio currents from the microphone.

The carrier from the mobile unit whose frequency is different from that generated by the stationary equipment, is received at the stationary apparatus through the plug 45, FIG. 1, and the switch 49 which will of course have been moved to its stand-by position in order to complete the circuit to the various components of the local or stationary equipment. The carrier current passes to the radio frequency amplifier 49 through the conductor 50. The radio frequency amplifier is connected to the detector 51, and the rectified currents therefrom pass both to the audio amplifier 53 and the solenoid amplifier 52 which controls the solenoid 54 whose function is to actuate the lever 5 as well as the double-throw switch 23 and the double-throw switch 59. The operation of solenoid 54 moves lever 5 upwards against the action of spring 11, causing the outer end 10 of this lever to lift away from the buttons 8 that control the regular telephone switch in the base *3a*. The microphone 14 and the reproducer or speaker 12 are of course connected to the usual components in the base unit *3a* by the regular cord 55. Inasmuch as the sounds reproduced by the speaker 15 are picked up by the microphone 14, the person who initially placed the call through the regular telephone may now hear whatever is spoken into the microphone 48 of the remote or portable unit.

The operation of the solenoid 54 also moves the switches 23 and 59 from their stand-by positions shown in FIGS. 1 and 2 to operative positions in which the transmitter forming a part of the local or stationary unit is properly connected and biased in order to pick up the modulated current or reproduced sound at the receiver or reproducer 12 and transmit it to the remote unit. Previous to the actuation of solenoid 54, the audio amplifier and modulator 25 and the radio frequency oscillator and amplifier 26 were susceptible only to the sounds picked up by the microphone 20 from the telephone bell 6 shown here in telephone base unit *3a*. The operation of the solenoid 54 moves the pole or armature 24 of switch 23 away from contact 22 into engagement with contact 56 which is connected to the pickup 13. As previously explained, the pole or movable arm 24 is connected to the audio amplifier and modulator 25, and the positioning of the armature 24 against contact 56 now completes the connection between the pickup 13 and this amplifier. The closing of switch 59 results in the proper biasing of the radio frequency amplifier 26 for the normal transmission of the modulated carrier, this radio frequency amplifier being connected by conductor 27 to the circuits that communicate with the plug 45. To effect the proper biasing required for this purpose, I provide a radio frequency output stage power supply 61 which is connected by the cable 60 to the aforementioned contact 58. The engagement of this contact by the armature 57 of the switch 59 thus completes the circuit that supplies the proper bias from unit 61 to unit 26. Not only is the audio amplifier and modulator 25 now properly connected to receive the audio currents from pickup 13, but the radio frequency amplifier 26 is properly biased for their transmission by way of the carrier whose frequency will have been predetermined by the fixed tuning of the transmitter circuits.

The raising or lifting of the handset 17 of the portable unit which completed the connection between the transmitter power supply 38 and the audio amplifier and modulator 40 by way of switch 37, also changes the position of arms 35 of switch 34 in order to move it from contact 36 into engagement with contact 62 which is connected by wire 63 with the reproducer or receiver 64 of the portable assembly.

From the foregoing description, it will doubtless be clear that my equipment makes it possible for normal telephonic conversation to take place between the user of the portable equipment and the person initiating the call through the regular telephone with which my equipment is associated.

In the preferred embodiment of my invention, I use transistors instead of tubes in order to make it possible to place all of the components required for my stationary apparatus in a small housing such as that of unit 2, FIG. 1A, and to similarly place all of the mobile components within the base 1 of the portable or remote unit FIG. 1B. The components which I use to achieve these purposes in the stationary apparatus are shown in the schematic diagram constituting FIG. 2, although it will be understood of course that all of the transistors, transformers, condensers, resistors, etc., are preferably embodied in a single housing, the only reason for isolating certain of the components in the assembly 2*a* being to facilitate an explanation of the mechanical and physical relationship between these specific components and the base of the telephone 3*a*.

The values for the various resistors, condensers and coils will not be given herein, as it will readily be understood by those skilled in the art that the values of these components will vary within wide limits in accordance with the particular transistors and other components that may be used. It may be advisable, however, to show the specific connections that I use in my preferred embodiment for some of the components. In this schematic drawing, the unit 65 is the source of all the power and the various voltages required for both the transmitter and receiver. Batteries are not used in this preferred embodiment for the reason that despite its low power supply requirements, the entire assembly must nevertheless have a connection through the plug 45 with the power lines in order to transmit and receive the carrier currents that are being used for transmission and reception, and I accordingly use the same power lines used for the carrier currents to supply the power that might otherwise be supplied by batteries. Similarly, and for the same reasons the power supply for the portable or mobile unit is obtained from the power lines through the plug 16.

In the transistorized assembly illustrated in FIG. 2, the audio currents from the microphone 20 or from the pickup 13 are selectively supplied through switch 23 to the base 66 of the transistor TR5 through condenser C19 and conductor 124. When microphone 20 is transmitting, not only will the microphone itself be connected into the circuit by means of switch 23, but the collector 67 of transistor TR8 will be indirectly connected to ground through the primary of transformer T7, conductor 68, the secondary 69 of transformer T5, conductor 70 and pole 57 of switch 59. When the modulations from the pickup 13 are to be transmitted, not only will the armature 24 of switch 23 be upon contact 56, but the armature 57 of switch 59 will likewise be in engagement with the upper contact 71 of switch 59. This will break the circuit between conductor 70 and the ground through switch 59 and complete a connection between conductor 70 and the power supply 65 through the armature or pole 57 and contact 71 which is connected to conductor 72 leading to the power supply unit 65. This means that collector 67 will no longer be indirectly connected to ground but that it will receive a different predetermined bias or potential from the power supply unit 65 through conductor 72, switch 59 and conductor 70.

The output terminal 73 of tarnsformer T7 is connected through condenser C30 to the power lines by way of conductors 74, 75, 76 and plug 45. The carrier current from the transmitter of the stationary unit is thus transmitted to the power lines or network. The stationary equipment receives the carrier from the portable apparatus through the conductors 76 and 75 last mentioned, from whence they are transmitted by way of conductors 77, 78 and condenser C31 to inductance L and the intermediate tap of the primary of the transformer T1.

The carrier receiver of the stationary assembly, as FIG. 2 reveals, consists of two stages of radio frequency amplification, a detector and a two-stage audio amplifier, plus a special amplifier for the currents to be used to operate the relay 79 that closes the circuit for the coil of solenoid 54. The stationary contact 80 of relay 79 is connected to the power supply 65 by means of conductor 81, and when the coil 181 of relay 79 is actuated by the signal received from the portable unit in response to the lifting of the handset thereon, the armature 82 of relay 79 engages contact 80 and thereby completes the circuit from the power supply through conductor 83 to one side of the solenoid 54. Inasmuch as the solenoid operates on direct current, a rectifier 94 is interposed on the other side of the line between the solenoid and the power supply 65, conductor 95 being connected to the solenoid and the rectifier, and the opposite terminal of the rectifier being connected to conductor 77 through the resistor R16.

The schematic diagram, FIG. 3, of the mobile or portable unit is in general harmony with the lower portion of the block diagram of this unit presented in FIG. 1. Only a few of the specific connections therefore need be pointed out. When the switches 34 and 37 of this unit are in their stand-by positions, the entire assembly has of course been energized through the placing of plug 16 in an appropriate receptacle and through the closing of switch 171. When the poles or movable arms 35 and 42 of switches 34 and 37, respectively, have moved into engagement respectively with contacts 62 and 43, switch 37 will then supply an appropriate voltage from the power supply 84 to the transmitter section comprising transistors TR5, TR6, TR7, TR8 and their associated circuitry.

When switch 34 is in its stand-by position, the secondary 90 of the output transformer of the receiver incorporated in the portable unit is connected by means of conductor 91 to the movable pole or arm 35 of switch 34, the stationary contact 36 and the conductor 92 to the bell or signalling device 18, but when the handset 17 has been lifted, pole 35 moves into engagment with stationary contact 62 which is connected to the reproducer or speaker 64 by means of conductor 93. The audio currents from the secondary 90 of the output transformer thus actuate this speaker or reproducer, making it possible for the sounds transmitted by the pick-up 13 of the stationary assembly to be heard at the portable unit.

The carrier current from the stationary or local unit is conducted to the input side of the receiver of the portable unit by means of the plug 16, conductors 93 and 94 and condenser C29. Other details of the circuits schematically shown in FIGS. 2 and 3 are not described because they form no part per se of the instant invention.

Various modifications may of course be made from the illustrative embodiments hereinbefore described, and numerous substitutions, reversals, transpositions and additions may be made without departing from the broad spirit of my invention as succinctly set forth in the appended claims.

I claim:

1. A two-way power-line carrier extension system for telephones, including: a first assembly comprising a structure for supporting and positioning a handset of a telephone; a first carrier transmitter tuned for transmitting on a first frequency and incorporating a first modulator and a pickup device, said pickup device so constructed and positioned with respect to said structure that it will pick up the modulations being received by the ear unit of said handset; a first microphone responsive to the sound of the bell associated with said telephone; a first carrier receiver tuned to a second frequency and comprising a first speaker so positioned with respect to said structure that sound from said first speaker will be directed into the mouth unit of said handset; a first power-supply unit for said first carrier transmitter and said first carrier receiver, said first power supply unit having a first pair of electric conductors for connecting it to an electric power source; means for electrically connecting said first transmitter and said first receiver through individual condensers to one of the conductors in said first pair; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; a first two-way switch acting in a first position thereof to connect said first modulator to said first microphone and in a second position thereof to connect said first modulator to said pick-up device; a second two-way switch acting in a first position to provide the modulator of said first transmitter with a bias voltage of such potential that it will prevent normal transmission excepting when the bias is overcome by the amplified current released by said first microphone in response to the sound from said bell, said second two-way switch acting in a second position to connect said modulator to a voltage source that will permit normal modulated transmission in response to currents passing through said pick-up device; and a solenoid acting in response to signals received on said first carrier frequency to move said lever and said first and second switches from their first positions to their second positions; plus A second assembly for optional mobile use comprising a second carrier transmitter for transmitting on said second frequency; a second carrier receiver tuned to said first frequency; a second power-supply unit for supplying power to said second carrier transmitter and said second carrier receiver, said second power-supply unit having a second pair of electric conductors for connecting it to an electric power source; an instrument incorporating a second microphone operatively connected to said second transmitter; an audible signaling means; a second speaker; means for electrically connecting said second transmitter and second receiver through individual condensers to one of the conductors in said second pair; a third switch acting in a first position to operatively connect said second radio receiver to said audible signaling means and in a second position thereof to operatively connect said second carrier receiver to said second speaker; and a fourth switch that in a second position thereof connects said second power-supply unit to said second transmitter and in a first position thereof breaks the circuit between said second power unit and said second transmitter, said third and fourth switches movable from their first positions to their second positions in response to the lifting of said instrument.

2. A two-way power-line carrier extension system for telephones, including: a first assembly comprising a structure for supporting and positioning a handset of a telephone; a pickup so constructed and positioned with respect to said structure that it will pick up the modulations being received by the ear unit of said handset; a first microphone responsive to the sound of the bell associated with said telephone; a first carrier transmitter tuned for transmitting on a first frequency and incorporating a transmission control element that when biased at a first potential will prevent transmission unless the sound entering said first microphone is above a predetermined level and when biased at a second potential will permit normal transmission; a first carrier receiver tuned to a second frequency and comprising a first speaker so positioned with respect to said structure that sound from said first speaker will be directed into the mouth unit of said handset; a first power-supply unit for said first carrier transmitter and said first carrier receiver, said first power-supply unit having a first pair of electric conductors for connecting it to an electric power source; means for electrically connecting said first transmitter and said first receiver through individual condensers to one of the conductors in said first pair; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; means for yieldably holding said lever in said first position; a first two-way switch acting in a first operative position thereof to connect said first transmitter to said first microphone and in a second operative position thereof to connect said transmitter to said pickup device; a second two-way switch acting in a first position to connect said control element to a portion of a circuit having said first potential and in a second position to connect said control element to a portion of a circuit having said second potential; and a solenoid acting in response to signals received on said first carrier frequency to move said lever and said first and second switches from their first positions to their second positions; plus A second assembly for optional mobile use comprising a second carrier transmitter for transmitting on said second frequency; a second carrier receiver tuned to said first frequency; a second power-supply unit for supplying power to said second carrier transmitter and said second carrier receiver, said second power-supply unit having a second pair of electric conductors for connecting it to an electric power source; an instrument incorporating a second microphone operatively connected to said second transmitter; an audible signaling means; a second speaker; means for electrically connecting said second transmitter and second receiver through individual condensers to one of the conductors in said second pair; a third switch acting in a first position to operatively connect said second radio receiver to said audible signaling means and in a second position thereof to operatively connect said second carrier receiver to said second speaker; and a fourth switch that in a second position thereof connects said second power-supply unit to said second transmitter and in a first position thereof breaks the circuit between said second power unit and said second transmitter, said third and fourth switches movable from their first positions to their second positions in response to the lifting of said instrument.

3. An assembly for use with a local telephone and with a remote carrier receiver tuned to a first frequency and obtaining its current from a power network also used for other purposes and with a remote carrier transmitter operating at a second frequency and obtaining its current from said network, said assembly including: a structure extraneous to said local telephone for supporting and positioning the handset thereof; a pickup device so constructed and positioned with respect to said structure that it will pick up the modulations being received by the ear unit of said handset; a first microphone responsive to the sound of the bell associated with said telephone; a first carrier transmitter tuned for transmitting on said first frequency and incorporating a transmission control element that when biased at a first potential will prevent transmission unless the sound entering said first microphone is above a predetermined level and when biased at a second potential will permit normal transmission; a first carrier receiver tuned to said second frequency and comprising a first speaker so positioned with respect to said structure that sound from said first speaker will be directed into the mouth unit of said handset; a first power-supply unit for said first carrier transmitter and said first carrier receiver, said first power supply unit having a first pair of electric conductors for connecting it to said power network; means for electrically connecting said first transmitter and said first receiver through individual condensers to one of the conductors in said first pair; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; means for yieldably holding said lever in said first position; a first two-way switch acting in a first position thereof to connect said first transmitter to said first microphone and in a second position thereof to connect said first transmitter to said pick-up device; a second two-way switch acting in a first position to connect said control element to a portion of the circuit of said first carrier transmitter having a first potential and in a second position to connect said control element to a portion of said circuit having a second potential; and a solenoid acting in response to signals received on said first carrier frequency to move said lever and said first and second switches from their first positions to their second positions.

4. An assembly for optional mobile use for communicating with a remote carrier transmitter tuned to a first frequency and obtaining its current from a power network also used for other purposes and with a remote carrier receiver tuned to a second frequency and obtaining its current from said network, said assembly including: a mobile carrier transmitter for transmitting on said second frequency; a mobile carrier receiver tuned to said first frequency; a power-supply unit for supplying power to said mobile carrier transmitter and said mobile carrier receiver, said power supply unit having a pair of electric conductors for connecting it to said network; an instrument incorporating a microphone operatively connected to said mobile transmitter; an audible signaling means; a speaker; means for electrically connecting said mobile transmitter and mobile receiver through individual condensers to one of the conductors in said pair; a first switch acting in a first position to operatively connect said mobile radio receiver to said audible signaling means and in a second position thereof to operatively connect said mobile carrier receiver to said speaker; and a second switch that in a second position thereof connects said power-supply unit to said mobile transmitter and in a first position thereof breaks the circuit between said power unit and said mobile transmitter, said first and second switches movable from their first positions to their second positions in response to the lifting of said instrument.

5. A two-way power-line carrier extension system for a telephone, including: a first assembly comprising a structure extraneous to said telephone for supporting and positioning the handset thereof; a pickup device so constructed and positioned with respect to said structure that it will pick up the modulations being received by the ear unit of said handset; a first microphone responsive to the sound of the bell associated with said telephone; a first carrier transmitter tuned for transmitting on a first frequency; a first carrier receiver tuned to a second frequency and comprising a first speaker so positioned with respect to said structure that sound from said speaker will be directed into the mouth unit of said handset; a first power-supply unit for said first carrier transmitter and said first carrier receiver, said first power supply unit having a first pair of electric conductors for connecting it to an electric power network; means for electrically connecting said first transmitter and said first receiver through individual condensers to one of the conductors in said first pair; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; means for yieldably holding said lever in said first position; a two-way switch acting in a first position thereof to connect said first transmitter to said first microphone and in a second position thereof to connect said transmitter to said pickup device; and a solenoid acting in response to signals received on said first carrier frequency to move said lever and said switch from their first positions to their second positions; plus A second assembly for optional mobile use comprising a second carrier transmitter for transmitting on said second frequency; a second carrier receiver tuned to said first frequency; a second power-supply unit for supplying power to said second carrier transmitter and said second carrier receiver, said second power-supply unit having a second pair of electric conductors for connecting it to an electric power source; an instrument incorporating a second microphone operatively connected to said second transmitter; an audible signaling means; a second speaker; means for electrically connecting said second transmitter and second receiver through individual condensers one of the conductors in said second pair; a second switch acting in a first position to operatively connect said second radio receiver to said audible signaling means and in a second position thereof to operatively connect said second carrier receiver to said second speaker; and a third switch that in a second position thereof connects said second power-supply unit to said second transmitter and in a first position thereof breaks the circuit between said second power unit and said second transmitter, said second and third switches movable from their first positions to their second positions in response to the lifting of said instrument.

6. An assembly for use with a local telephone and with a remote carrier receiver tuned to a first frequency and obtaining its current from a power network also used for other purposes and with a remote carrier transmitter operating at a second frequency and obtaining its current from said network, said assembly including: a structure extraneous to said local telephone for supporting and positioning the handset thereof; a pickup device so constructed and positioned with respect to said structure that it will pickup the modulations being received by the ear unit of said handset; a first microphone responsive to the sound of the bell associated with said telephone; a first carrier transmitter tuned for transmitting on said first frequency; a first carrier receiver tuned to said second frequency and comprising a first speaker so positioned with respect to said structure that sound from said speaker will be directed into the mouth unit of said handset; a first power-supply unit for said first carrier transmitter and said first carrier receiver, said first power-supply unit having a first pair of electric conductors for connecting it to an electric power source; means for electrically connecting said first transmitter and said first receiver through individual condensers to one of the conductors in said first pair; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; means for yieldably holding said lever in said first position; a two-way switch acting in a first position thereof to connect said first transmitter to said first microphone and in a second position thereof to connect said transmitter to said pickup device; and a solenoid acting in response to signals received on said first carrier frequency to move said lever and said switch from their first positions to their second positions.

7. A two-way power-line carrier extension system for a telephone, including: a first assembly comprising a structure extraneous to said telephone for supporting and positioning the handset thereof; a pickup device so constructed and positioned with respect to said structure that it will pick up the modulations being received by the ear unit of said handset; a first microphone responsive to the sound of the bell associated with said telephone; a first carrier transmitter tuned for transmitting on a first frequency; a first carrier receiver tuned to a second frequency and comprising a first speaker so positioned with respect to said structure that sound from said speaker will be directed into the mouth unit of said handset; a first power-supply unit for said first carrier transmitter and said first carrier receiver, said first power-supply unit having a first pair of electric conductors for connecting it to an electric power network; means for so connecting said first transmitter and said first receiver to said network that they may respectively transmit and receive carrier currents thereover; a lever having a portion so constructed and arranged that it may be disposed over the switching means on which said handset normally rests when not supported on said structure, said lever acting in a first position thereof to engage and depress said switching means and in a second position thereof to permit said means to move upward to its in-use position; means for yieldably holding said lever in said first position; means acting in response to signals received on said first carrier frequency to move said lever from its first position to its second position; and instrumentalities acting when said lever is in said first position to connect said first transmitter to said first microphone and when said lever is in said second position to connect said transmitter to said pick-up device; plus A second assembly for optional mobile use comprising a second carrier transmitter for transmitting on said second frequency; a second carrier receiver tuned to said first frequency; a second power-supply unit for supplying power to said second carrier transmiter and said second carrier receiver, said second power-supply unit receiving its current from said power network; an instrument incorporating a second microphone operatively connected to said second transmiter; an audible signaling means; a second speaker; means for so connecting said second transmitter and said second receiver to said network that they may respectively transmit and receive carrier currents thereover; a first switch acting in a first position to operatively connect said second receiver to said audible signaling means and in a second position thereof to operatively connect said second receiver to said second speaker; and a second switch that in a second position thereof connects said second power supply unit to said second transmitter and in a first position thereof breaks the circuit between said second power unit and said second transmitter, said first and second switches movable from their first positions to their second positions in response to the lifting of said instrument.

8. In a two-way power-line carrier extension system for telephones, a first assembly comprising (a) a radio-type transmitter connectable to power lines for transmitting its carrier thereover, (b) a power-supply unit for said transmitter receiving its current from said power lines, (c) a telephone handset incorporating a microphone coupled to said transmitter, (d) a support for said microphone, (e) a switch acting in response to the lifting of said microphone from said support to connect said power-supply unit to said transmitter; and a second assembly for local use in connection with the telephone whose service is being extended, said second assembly comprising (a) a radio-type receiver tuned to the frequency of said carrier, and (b) a device having a portion positionable above the actuating means for the switch of said telephone when its handset has been removed therefrom, said portion movable from a first inactive position in which it presses upon said actuating means to a second position in which it releases said actuating means upon receipt by said receiver of a carrier current from said transmitter.

9. In a two-way power-line carrier extension system for telephones, a first assembly for local use with the telephone whose service is being extended, said first assembly comprising (a) a microphone so positioned with respect to the bell of the telephone whose service is being extended that the sound from said bell will produce current variations in said microphone, and (b) a radio-type transmitter connected to power lines and acting to release a carrier current thereover in response to the current variations produced in said microphone by the ringing of said bell; and a second assembly for portable use anywhere within the territory where the power lines are so interconnected with those supplying said transmitter that the carrier currents therefrom will not be interrupted, said second assembly comprising (a) a radio-type receiver tuned to the frequency of said carrier, (b) an electric signaling device, (c) a sound reproducer, and (d) a switch which in the stand-by position connects said receiver to said signaling device and in a second position thereof connects said receiver to said sound reproducer, said switch movable from said stand-by position to said second position in response to a manual operation.

References Cited by the Examiner

UNITED STATES PATENTS

| | | | |
|---|---|---|---|
| 2,848,540 | 8/1958 | Cooney | 179—2.5 |
| 2,894,121 | 7/1959 | Phillips | 325—64 |
| 2,907,827 | 10/1959 | Voell | 179—1 |
| 3,100,818 | 8/1963 | Carter | 325—55 |

DAVID G. REDINBAUGH, *Primary Examiner.*

E. C. MULCAHY, S. J. GLASSMAN, *Assistant Examiners.*